Aug. 16, 1960

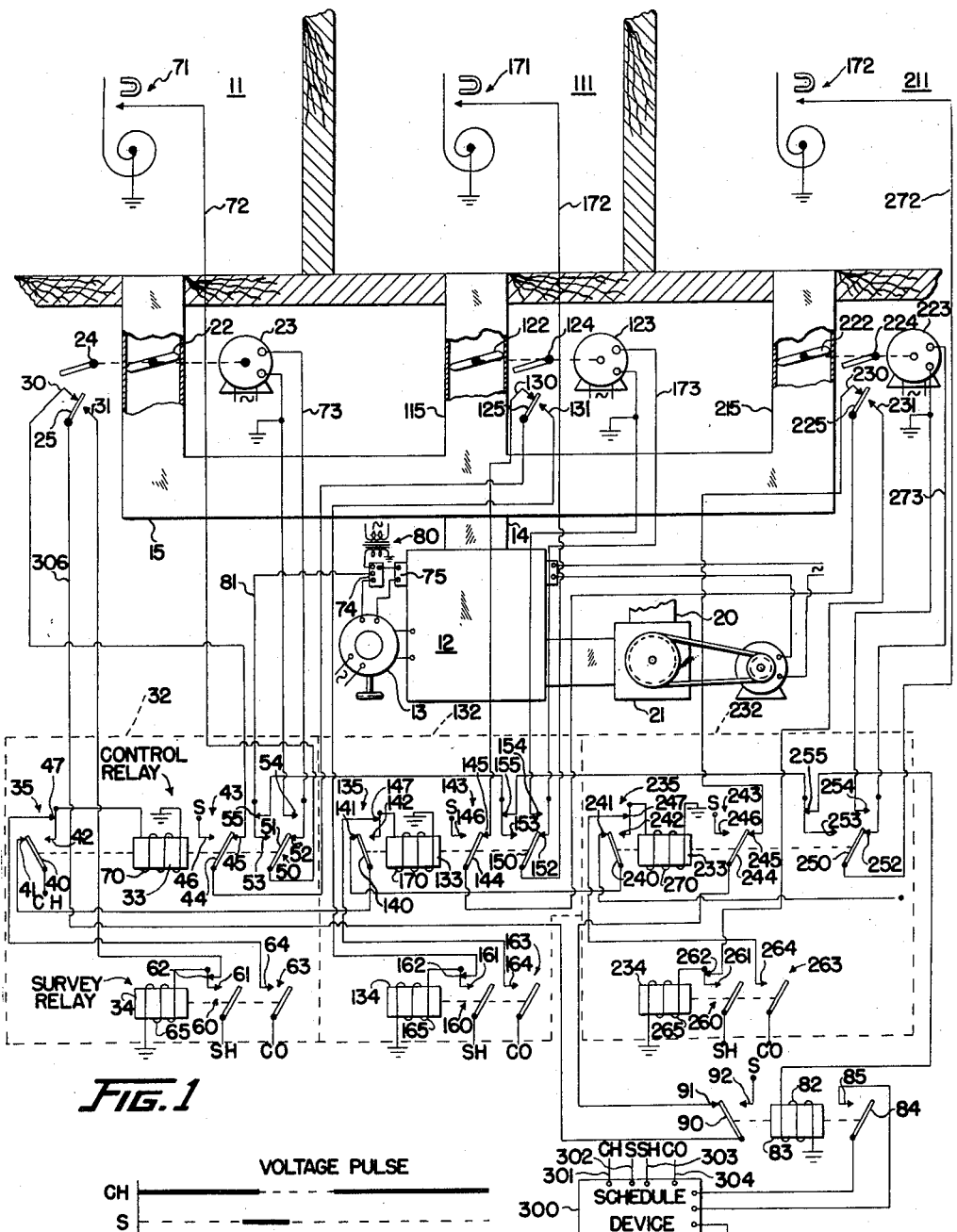

C. W. NESSELL 2,949,234

ZONE TEMPERATURE CONTROL APPARATUS
WITH SHIFTING AUTHORITY

Filed Sept. 19, 1956

INVENTOR.
CLARENCE W. NESSELL
BY
Joseph E. Ryan
ATTORNEY

United States Patent Office 2,949,234
Patented Aug. 16, 1960

2,949,234

ZONE TEMPERATURE CONTROL APPARATUS WITH SHIFTING AUTHORITY

Clarence W. Nessell, Mount Prospect, Ill., assignor to Minneapolis-Honeywell Regulator Company, Minneapolis, Minn., a corporation of Delaware Filed Sept. 19, 1956, Ser. No. 610,732

3 Claims. (Cl. 236—11)

The present invention is concerned with an improved air conditioning system, in particular, an area or zone control system in which a plurality of areas receives condition medium from a central source. The flow of medium to each area is controlled by its respective area thermostat with the exception of the area having the greatest conditioning load, it being connected to control the source.

While zone or area control of air conditionnig systems has been very popular for a number of years, it has been recognized that there were many unsatisfactory results in such systems which took away from the ultimate in comfort such systems should provide. In a conventional zone control system a plurality of zones are connected by ducts to a furnace for the delivery of condition medium to the zones. In a forced air system the air delivered through the ducts to each zone is controlled by a damper controlled by the zone thermostat. The heat source, or cooling source in a cooling system, has been controlled in many ways, most commonly from a plenum control which maintains the air temperature in the plenum at some predetermined level. When the temperature in the zones is satisfied and the zone dampers close there is provided a means of shutting down the conditioning source, as well as the fan. In such a system it is obvious that the temperature of the air directed into the zones is substantially the same regardless of the position of the zone damper, thus, as a zone becomes satisfied and the damper closes down, not only is it possible for the zone to overheat due to the possible leakage past the zone damper but there may be an extended period of no air flow into the zone. This is especially true where external sources supply heat to a zone to maintain its temperature at the desired level keeping the zone damper closed and causing the air in the zone to become stagnant. An example of this, of course, is where a large group of people congregate in a living room or one zone of a dwelling and the natural heat from their bodies tends to heat the temperature of the zone up. Thus, the zone damper would close and no air would circulate in that zone.

In the Hubert T. Sparrow Patent 2,805,026 issued September 3, 1957, an improvement in a zone control system is shown. In this system the plenum temperature is not only regulated by the outdoor temperature but it is reset or reduced in addition to the outdoor control by an amount indicative of the total flow of air to all of the zones. Thus, as the zones become satisfied and the dampers close the plenum temperature is reduced. This lowers the heat delivery to the zones per quantity of air and tends to prevent the zone dampers from closing all the way to block off air flow completely. It has been found with such a system that upon proper calibration the zone dampers modulate in their intermediate position almost all of the time rather than reducing air flow alone to cut down the delivery of heat to the zone. The temperature of the air itself is reduced, thus the delivery of air can be maintained higher than it would be if its temperature were not reduced.

In the applicant's invention the zone control system accomplishes substantially that of the Sparrow invention with additional advantages. The applicant controls the zone dampers by means of the zone thermostats, however, in order to reduce the temperature of the air as a function of the total load of all of the zones, the thermostat in the zone requiring the greatest load is connected to control the burner or conditioning source. There is further provided a means of surveying the controlling system to determine which of the zones has the greatest load and to place it in control of the conditioning source.

This ineffect accomplishes what would basically be done in a forced air system wherein only one thermostat was used. On a still cold night the installer of the heating system would make the final adjustment by measuring the temperatures in each of the rooms and positioning the dampers in the ducts leading to the rooms so that an even temperature was maintained throughout the dwelling by a common thermostat located in a representative place. With such a final adjustment, it is of course obvious as the weather conditions change and the wind direction changes or the sun load changes, the system actually will need readjustment. The invention of this case is believed to accomplish just that. By means of a survey periodically the position of the heat source controlling thermostat is selected so that the heat output of the furnace will be adjusted to be more representative with the total load.

With such an improved condition controlling system the delivery of air to the zones will be maintained more constant regardless of the load of the zone, this contributing to a greater measure of comfort in zone or area control systems.

It is therefore an object of the present invention to provide an improved conditioning system in which a plurality of areas receive a condition medium.

Another object of the present invention is to provide an improved zone or area control system in which the supply of condition medium from a source is controlled by responsive means in each of the respective zones and the output of the source is controlled by the requirements of the zone having the greatest load.

And still another object of the present invention is to provide in a zone control system in which conditioned air is delivered from a source to a plurality of zones and the flow of air to each zone is controlled by a zone thermostat with the zone thermostat of the zone having the greatest load controlling the source and thus temperature of the air being supplied thereby.

These and other objects will become apparent upon the study of the specification and drawing of which:

Figure 1 shows a schematic diagram of a zone control system when applied to a forced air heating installation.

Figure 2 represents a typical output schedule of the schedule device as shown in Figure 1.

Figure 3:
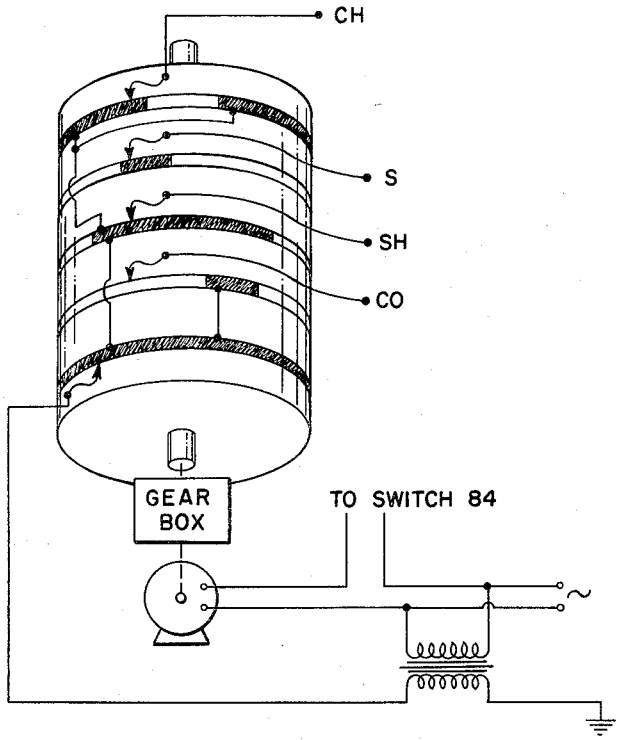
Figure 3 is a detail showing of a typical schedule device.

The present invention is applied to a conventional forced air heating system which furnishes heat to a plurality of areas or zones. It is obvious that the specific disclosure has been selected for illustrative purposes only as the invention is applicable to other types of conditioning systems. A plurality of zones 11, 111, and 211 are shown. The numbering has been so selected that similar parts in zone 11 will be labeled in the second and third zones by only the addition of 100 or 200 to make the specification more readily understandable. A furnace 12 having a burner 13 supplies heated air to the zones through a common duct 14 branching off into ducts 15, 115, and 215, connected to zones 11, 111 and 211, respectively. Air is returned from the zones through a return duct 20 by a conventional fan 21 having a motor controlled by a conventional plenum control.

Referring in particular to the zone 11, a damper 22 is shown blocking the air flow through duct 15. The damper is controlled by a motor 23 of a conventional sort having a power supply and terminals which when a circuit exists therebetween the motor is energized to move the damper in a counterclockwise direction allowing air to flow through the duct. Also connected to the motor is a member 24 which engages a switch arm 25 when the damper is fully open to move member or arm 25 away from contact 30 and against contact 31.

Associated with zone 11 is a control panel 32 having a control relay 33 and a survey relay 34. Associated with the control relay is a switch 35 having a movable member 40 engaging contact 41 when relay 33 is de-energized and a contact 42, when the control relay is energized. When member 40 is moved against contact 42 a switch 47 breaks. A second switch 43 comprises a member 44 engaging a contact 45 when the control relay is de-energized and a contact 46 when the control relay is energized. Another switch 50 comprises a movable member 51 engaging a contact 52 when relay 33 is de-energized and contact 53 when the control relay is energized. Associated with contacts 52 and 53 are switches 54 and 55 respectively which are open whenever movable member 51 engages the associated contacts.

Survey relay 34 has a switch 60 having a movable member which engages the contact 61 when relay 34 is energized. Upon engaging contact 61 a switch 62 is opened. A second switch 63 has a movable member which engages a contact 64 when the relay 34 is energized. The survey relay has an energization winding 65 connected between a ground terminal and switch 62 and contact 61 so that it can be energized through switch 62 and a holding circuit can be established through switch 60. Control relay 33 has an energization winding 70 connected between the ground terminal and switch 47 and contact 42 so that the control relay is energized to close switch 42 establishing a holding circuit.

A thermostat 71 in zone 11 is connected by a conductor 72 to a movable member 51 so that it can be selectively connected to control either the zone damper motor 23 or burner 13. As shown, it is connected to control damper motor 23 through the circuit comprising contact 52, which is connected to one terminal of the motor by a conductor 73, the other terminal being connected to ground. Thus, the circuit is established so that when the thermostat 71 closes to call for heat, the damper motor is energized to move the damper in a counter-clockwise direction allowing air to flow from the furnace into the zone 11.

Figure 4:
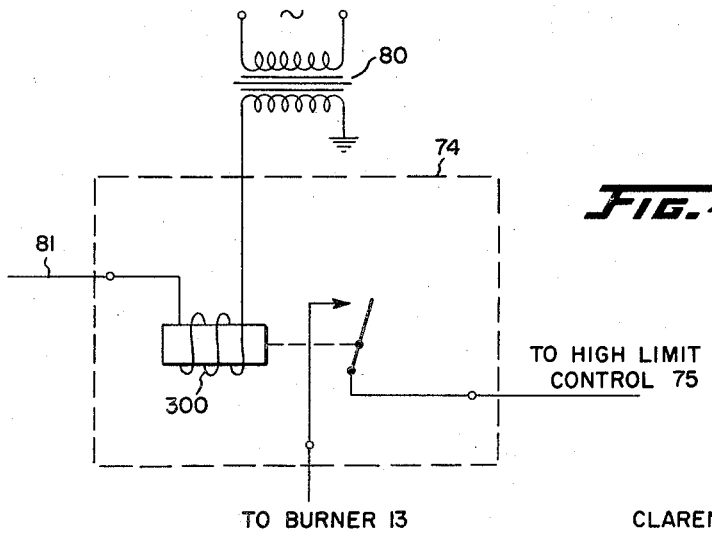
Figure 4 is a detail showing of a typical relay for controlling a burner.

Burner 13 is energized by a conventional control panel 74 through a plenum or high limit control 75. Panel 74 is shown in detail in Figure 4. Control 74 has a source of power 80 which is applied thereto through the circuit traced through the secondary of the transformer from ground, through the control relay, conductor 81, switch 55, switch 155, switch 255 through the winding 82 of an initial start-up for recovery relay 83, and to ground. The circuit thus described limits the current to the control relay 74 so that with the winding 82 in the circuit, the control relay is not energized and the burner is not placed in operation. Upon the energization of any of the three control relays 33, 133 and 233, member 51, or the other respective members, engages contact 53 to break switch 55 which places the thermostat of the zone associated with the energized control relay in control of the burner. Once the system is in operation, the relay 83 need not be energized as it only provides for proper operation when the system is started up initially or recovering from a power failure.

Relay 83 has a first switch associated therewith having a movable member 84 which engages a contact 85 when the relay is energized. A second switch has a movable member 90 normally engaging a contact 91 when the relay is de-energized and engaging a contact 92 when the relay is energized.

A schedule device or timer 300 has a plurality of outputs 301, 302, 303 and 304 labeled CH for Control Hold, S for Survey, SH for Survey Hold, and CO for Control Operate. The terminals provide for voltages at different periods on a time sequence as might be produced by a timer such as shown in Figure 3 having a plurality of cams with segments engaged by wipers so designed to produce voltage pulses such as graphically shown in Figure 2.

Referring to Figure 2, the voltage pulses are shown as they exist over a time period extending between X and Y which is determined for the particular needs of the installation and might, for example, be repeated every hour. The length of the pulses as shown in Figure 2 are for illustrative purposes only and it is obvious that they may be so changed to meet a particular installation.

Upon the initial start-up relay 83 is energized to cause movable member 84 to engage contacts 85. A circuit is established to initiate operation of the schedule device at a predetermined position such as shown on the diagram in Figure 2 as time W so that the survey of the system, as will be hereafter explained, will be initiated at an early period.

The various controls panels 32, 132, 232 as well as a schedule device output are connected in a system in the following manner. Member 25 is connected to movable member 90 by conductor 306. As shown with all of the dampers in a closed position a circuit exists from contact 91 through movable member 244 and contact 245, contact 230 and movable member 225, movable member 144 and contact 145, contact 130 and movable member 125, movable member 44 and contact 45 and contact 30 and movable member 25 back to the movable member 90 through conductor 306.

The following circuit connections as described in connection with the zone 11 and its associated panel are also applicable for the other zones. Contact 31 is connected to switch 62. Switch 47 is connected to contact 64. Member 40 is connected to terminal 301 of schedule device 300. Contact 46 is connected to terminal 302 of the schedule device. The movable member of switch 60 is connected to terminal 303 of the schedule device and the movable member of switch 63 is connected to the terminal 304 of the schedule device.

A circuit can be traced from movable member 40 through contact 41, movable member 140 and contact 141, movable member 240 and contact 241. This circuit as well as other circuits heretofore mentioned can be so connected with more zones in the system by only the addition of other panels of the sort described in connection with panel 32.

Operation

Assuming that power was supplied to the circuit as shown in Figure 1 at the various inputs indicated such as tronsformer 80, the damper motors, and the schedule device, immediately the initial start or recovery relay 83 would be energized through the circuit from the relay coil 82 through switch 255, 155, 55 and through the burner control 74 to the source of power 80. This circuit has a sufficiently high resistance due to the resistance of winding 82 and winding 300 in Figure 4 to provide energization of relay 83 and yet not energize control 74 to start the burner. Upon energization of relay 83, member 90 engages contact 92 and member 84 engages contact 85. As mentioned before, the circuit through member 84 and contact 85 initiates the schedule device 300 at some point such as W on the time scale of Figure 2. This assures that the survey voltage S will soon appear to place the system in operation. The survey voltage, upon member 90 engaging contact 92, is applied to the circuit as traced from member 90, conductor 306, member 25, contact 30, switch 43, member 125 and contact 130, switch 143, member 225 and contact 230 and switch 243.

As shown and upon the initial starting of the system, the dampers are closed. Upon power being applied to the motors, should the thermostat in the zones call for heat and be closed the damper motors would be energized to move the dampers counter-clockwise in an opening direction. The first damper to reach the wide open position will immediately take over control. There is a preference when two or more dampers simultaneously reach their wide open positions, the preference being to the zone that is shown to the farthermost left.

Let us assume that the thermostat of zone 11 closes and the damper 22 moves to the fully open position. As it reaches the fully open position, arm 24 will engage member 25 to break the circuit between it and contact 30 and make the circuit between member 25 and contact 31. This switch, while shown schematically, could be a snap switch of some sort which would simultaneously break one side and make the other when the damper reached the fully open position. Upon engaging contact 31, member 25 connects the survey voltage to the survey relay 34 and its winding 65 is energized. A holding circuit through switch 60 is closed and the SH or survey hold voltage maintains energization of relay 34. When the fully open position damper switch of zone 11 is operated, it breaks the circuit so that the survey voltage available through conductor 306 is not applied to any of the other zones should their dampers reach a fully open position subsequent to the damper of zone 11. This establishes the preference heretofore mentioned.

As the schedule device moves further along in time, as shown in Figure 2, the survey voltage S available at terminal 302 would be terminated and the survey hold SH voltage is maintained on terminal 303 to energize survey relay 34. Upon the availability of the control operator CO voltage at terminal 304 is applied through switch 63 to control relay 33 through contact 47. Upon the energization of the control relay winding 70, the control relay holding circuit is closed and the control hold voltage CH is applied through the circuit comprising member 40 when it engages contact 42. The control operate CO voltage previously available through the circuit comprising contact 43 is taken off of the relay as the voltage CH is available through the circuit having the movable member and contact 42. Energization of control relay 33 connects thermostat 71 to the burner control 74 through the circuit comprising movable member 51, contact 53 and conductor 81. At the same time, switch 55 is broken; so that, no other zone is able to take away the control of the burner from zone 11.

When movable member 50 moves away from contact 52, switch 54 is made and this places a short across the control circuit of motor 23 to hold damper 22 in fully open position. The system will continue to operate with only the CH voltage available at terminal 301 on the schedule device. As now connected, the thermostat of zone 11 will control the burner and the damper of zone 11 is wide open. The other remaining zones 111 and 211 will have their dampers controlled by the thermostat.

The time required for the schedule device to make a complete cycle, that is, to produce the Survey Voltage as well as the Survey Hold and Control Operate voltages, can be selected for the particular need. In a typical forced air system as this it might be desirable to survey the control system every ten or fifteen minutes. As the system is now operating, it would continue to operate until the schedule device returned to again reach the position W on the time scale as shown in Figure 2. The survey voltage would then be applied to contacts 46, 146 and 246 as well as the contact 92. Let us now assume that the damper of zone 211 was wide open and the temperature in zones 11 and 111 were such that the dampers should be partly closed. As presently connected, it was indicated that zone 11 had its thermostat controlling the burner and the damper wide open. When the control hold voltage terminated, the previously energized control relay 33 would be de-energized and the survey voltage would then energize the survey relay of the zone which was having the greatest heat load at that particular time. The survey voltage for the energization of survey relay 234 is then fed through a circuit as follows: from the winding 265, switch 262, contact 231 and member 225, member 144 and contact 145, contact 130 and member 125, member 44 and contact 46. Shortly thereafter in time the control hold voltage as shown in Figure 2, will terminate and the previously energized control relay 33 will be de-energized. As soon as survey relay 234 is energized, the survey hold voltage available through switch 260 would energize winding 265. Also, switch 262 is broken to disconnect the survey relay from the aforementioned circuit. As soon as the control operate voltage was available from terminal 304 it would be fed through switch 264 to operate control relay 233 and holding circuit would be established through the circuit as follows: control relay winding 270, contact 242, member 240, contact 141 and member 140, and contact 41 and member 40. With the control relay 233 energized, the thermostat of zone 211 is connected to control the burner through a circuit as follows: thermostat 172, conductor 272, member 250 and contact 253, switch 155, switch 55 and conductor 81 to control 74. Also the damper 222 would be held in an open position as the input terminals to motor 222 would be shorted by switch 254.

With such a control system, the survey would be made periodically and the zone having the greatest heat load would be placed in control of the burner so that the temperature of the air being delivered from furnace 12 would be maintained as low as possible and yet satisfy the heat requirements of the coldest zone. This tends to keep the dampers of the other zones in a more open position which would maintain the air circulation in those zones decreasing the undesirable stagnation effect which often results in a zone control system where a zone damper closes completely. Of course whenever a zone thermostat is turned up, such as after an extended period of zone shut-down, it is obvious that particular zone takes over control of the furnace. While it may not be the zone having the greatest heat loss under normal conditions, it is the zone requiring the greatest amount of heat. As soon as normal load conditions were attained in the overall dwelling, the control system continues to survey and keep the zone having the greatest heat loss in control of the burner.

While the invention of this case has been disclosed in a particular manner, for explanation purposes, it should be realized that the invention should be in no manner limited by the disclosure but only by the scope of the appended claims in which I claim:

1. In a zone controlled air conditioning system having an air conditioning unit connected to supply conditioned air to a plurality of zones, each of which has an individual air supply duct; a movable air flow control damper in each of the ducts to control the flow of air therethrough, condition responsive means in each of the zones, each of said condition responsive means being responsive to the need for conditioned air in its respective zone, means connecting each of said condition responsive means in controlling relation to the flow control damper in the duct of its respective zone to thereby control the flow of conditioned air to its respective zone in accordance with the need therefore, and control means for said air conditioning unit including means associated with each of said dampers and responsive to one of said dampers which is a position indicating a greater need for conditioned air in its respective zone to connect its respective condition responsive means in controlling relation to said air conditioning unit and thereby insure that said air conditioning unit is at all times controlled by a condition responsive means which is experiencing the greatest demand for conditioned air.

2. In an air conditioning system having an air conditioning unit connected to supply conditioned air to a plurality of spaces, each space has an individual air supply duct for delivering air from the conditioning unit to each space; a movable air flow control damper in each of the ducts to control the flow of air to each space, temperature responsive means in each of the spaces, each of said temperature responsive means being responsive to the need for conditioned air in its respective zone, means connecting each of said temperature responsive means in controlling relation to the flow control damper in the duct of its respective space to thereby control the flow of conditioned air to its respective space to maintain the temperature in each space at a predetermined value as selected by adjustment of the control point of said responsive means, control means for said air conditioning unit including means associated with each of said dampers and responsive to one of said dampers which is in a position indicating a greater need for conditioned air in its respective space to connect its respective temperature responsive means in controlling relation to said air conditioning unit and thereby insure that said air conditioning unit is at all times controlled by a space responsive means which is experiencing the greatest demand for conditioned air, and means for periodically surveying the load of each of said spaces and transferring the control of said air conditioning unit to the space responsive means of the space having the greatest need for conditioned air.

3. An improvement to a temperature control system for a plurality of spaces having temperature responsive means in each space, a furnace, a plurality of conduits connecting the furnace to each space so heated medium can be delivered to each space, a flow control device in each of said conduits, means connecting each of said responsive means to control said flow control device of the respective conduits to deliver the quantity of heated medium to said space to satisfy the heating load of the space and to maintain a selected temperature depending on said responsive means, and means connecting said responsive means of one of said zones to control said furnace and driving said flow control device in the conduit of said one zone to a predetermined position; the improvement comprising, means for periodically surveying the heating load of each zone to transfer the control of the furnace to space temperature responsive means of the space having the greatest heating load of all the zones, and further means for maintaining the flow control device of the zone having the greatest heating load in said predetermined position.

References Cited in the file of this patent

UNITED STATES PATENTS

| | | |
|---|---|---|
| 430,226 | Easton | June 17, 1890 |
| 2,235,620 | Nessell | Mar. 18, 1941 |
| 2,468,830 | Marksham | May 3, 1949 |
| 2,560,829 | Stewart | July 17, 1951 |